United States Patent
Feng

(10) Patent No.: US 6,474,900 B2
(45) Date of Patent: Nov. 5, 2002

(54) FAST DISMANTLING DEVICE

(75) Inventor: Pin-Chieh Feng, Chang Hua Hsien (TW)

(73) Assignee: Melton International L.L.C., Dover, DE (US)

( * ) Notice: Subject to any disclaimer, the term of this patent is extended or adjusted under 35 U.S.C. 154(b) by 16 days.

(21) Appl. No.: 09/843,829

(22) Filed: Apr. 30, 2001

(65) Prior Publication Data

US 2002/0136598 A1 Sep. 26, 2002

(30) Foreign Application Priority Data

Mar. 22, 2001 (TW) ........................................ 90204529 U

(51) Int. Cl.[7] ................................................ F16B 21/00
(52) U.S. Cl. .................... 403/322.4; 403/110; 403/323; 403/373; 403/376; 248/316.6; 248/230.5; 248/231.61
(58) Field of Search ............................. 403/321, 322.1, 403/322.4, 323, 324, 374.2, 373, 379.4, 376, 109.1, 110; 248/230.5, 231.61, 316.6

(56) References Cited

U.S. PATENT DOCUMENTS

| | | | | |
|---|---|---|---|---|
| 2,849,249 A | * | 8/1958 | Fridolph | |
| 5,181,684 A | * | 1/1993 | Sager | 248/231.6 |
| 5,440,948 A | * | 8/1995 | Cheng | 403/322 |
| 5,515,744 A | * | 5/1996 | Liao | 403/373 |
| 5,556,222 A | * | 9/1996 | Chen | 403/323 |
| 5,775,352 A | * | 7/1998 | Obitts | 403/110 |
| 6,021,834 A | * | 2/2000 | Malott | 248/286.1 |
| 6,142,699 A | * | 11/2000 | Pao | 403/109.5 |

* cited by examiner

Primary Examiner—Lynne H. Browne
Assistant Examiner—James M. Hewitt
(74) Attorney, Agent, or Firm—Browdy and Neimark

(57) ABSTRACT

A fast dismantling device comprises two C-shaped fitting rings, two shaft bolts, two pivots, two dial rods, and a connection rod. The fitting rings are provided with a through hole and are fitted over an outer tube. The shaft bolts include a head and a shank which is received in the through hole of the fitting rings. The pivots are disposed at the free ends of the shanks of the shaft bolts. The dial rods comprise a cam portion which is formed of two actuation pieces. The shaft bolts are disposed between the two actuation pieces. The actuation pieces are provided with a through hole for receiving the pivot. The connection rod is connected at both ends thereof with the dial rods. As the connection rod is wrenched to actuate the dial rods, the fast dismantling device is capable of fastening or unfastening simultaneously two pairs of inner and outer tubes.

7 Claims, 3 Drawing Sheets

FAST DISMANTLING DEVICE

FIELD OF THE INVENTION

The present invention relates generally to a locating device, and more particularly to a fast dismantling device capable of locating simultaneously two pairs of inner and outer tubes.

BACKGROUND OF THE INVENTION

The conventional fast dismantling device comprises a C-shaped fitting ring, a bolt put through the free end of the fitting ring, and a dial rod pivoted at one end with the bolt. The pivoting end of the dial rod is provided with a cam. By wrenching the dial rod, the fitting ring can fasten or unfasten so as to locate the inner tube and the outer tube at a predetermined position. However, two sets of the fast dismantling device are called for in the event that two or more pairs of inner and outer tubes are to be located simultaneously. The dial rod of each of fast dismantling devices must be wrenched to locate the inner and the outer tubes, thereby resulting in a great deal of inconvenience.

SUMMARY OF THE INVENTION

The primary objective of the present invention is to provide a fast dismantling device capable of separating simultaneously two or more pairs of inner and outer tubes.

In keeping with the principle of the present invention, the foregoing objective of the present invention is attained by a fast dismantling device, which comprises two C-shaped fitting rings, two shaft bolts, two pivots, and two dial rods. The fitting rings are fitted over the outer tubes and are provided at the free end with a through hole. The bolts comprise a head and a shank extending from the center of the head such that the shank is received in the through hole of the fitting rings. The pivots are disposed at the free ends of the shanks of the bolts. The dial rods are provided with a cam which is extended out from one end of the dial rods and is composed of two parallel actuation pieces. The shank of the bolts is disposed between the two actuation pieces which are provided with a through hole for receiving the pivot. The dial rods are connected with a connection rod by means of which the dial rods are actuated to enable the fast dismantling device to fasten or unfasten simultaneously two pairs of inner and outer tubes.

DETAILED DESCRIPTION OF THE INVENTION

Figure 1:
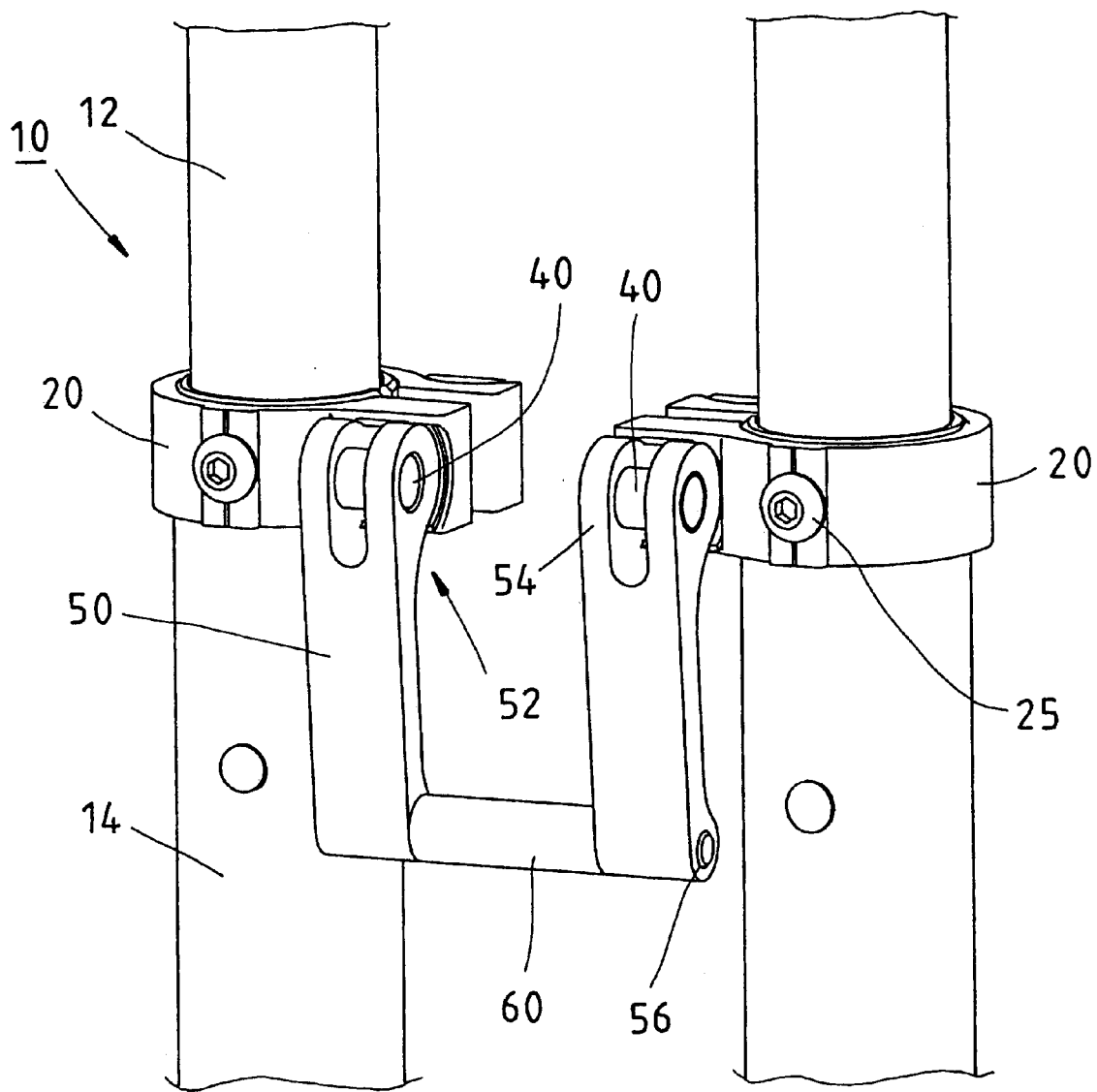
FIG. 1 shows a perspective view of a preferred embodiment of the present invention.
Figure 2:
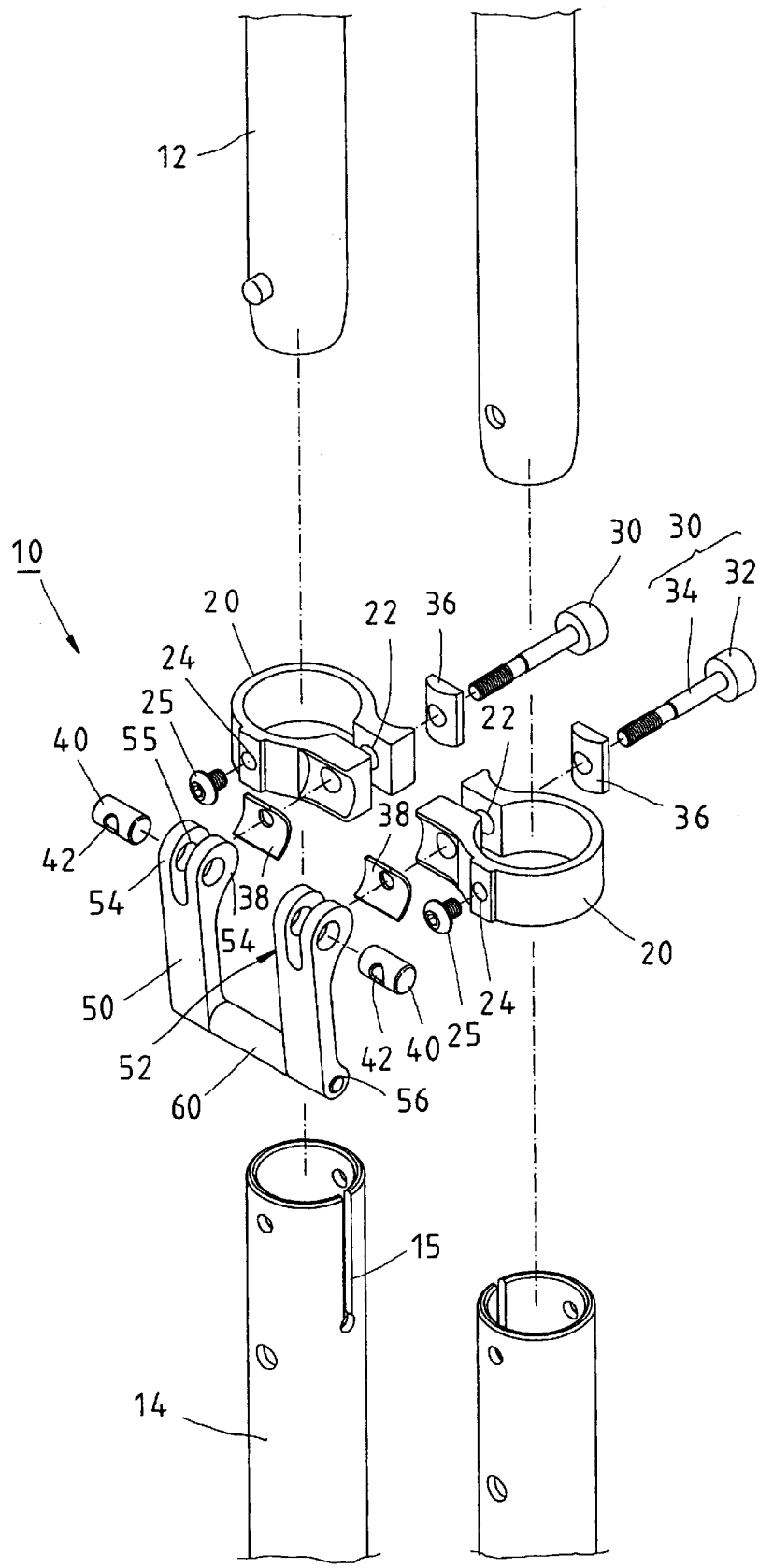
FIG. 2 shows an exploded view of the preferred embodiment of the present invention.

As shown in FIGS. 1 and 2, a fast dismantling device 10 embodied in the present invention is intended to separate simultaneously two pairs of inner and outer tubes 12 and 14 which are slidably fitted together. The outer tubes 14 are provided at the top end with a tangent slot 15. The fast dismantling device 10 comprises two fitting rings 20, two shaft bolts 30, two pivots 40, two dial rods 50, and a connection rod 60.

The fitting rings 20 are of a C-shaped construction and are fitted over the top ends of the outer tubes 14. The fitting rings 20 are provided at the free end with a through hole 22. The fitting rings 20 are further provided in the body with a threaded hole 24 which is engaged with a bolt 25. The bolt 25 urges the outer tube 14 for joining the fitting rings 20 with the outer tubes 14.

The shaft bolts 30 comprises a head 32 and a shank 34 extending from the center of the head 32 such that the shank 34 is received in the through hole 22 of the fitting ring 20. The free end of the shank 34 is provided with outer threads.

The pivots 40 are provided in the shank with a threaded hole 42 perpendicular to the longitudinal direction of the shank. The threaded hole 42 is engaged with the outer threads of the shaft bolt 30.

The dial rods 50 comprise a cam portion 52 extending out therefrom and having two parallel actuation pieces 54 between which the shank 34 of the shaft bolt 30 is disposed. The actuation pieces 54 are provided with a through hole 55 for receiving the pivot 40. The dial rods 50 are provided at the bottom end with an end hole 56.

The connection rod 60 is fastened at both ends with the end holes 56 of the dial rods 50.

The shank 34 of the shaft bolt 30 is provided with a pad 36 which is located between the head 32 and the fitting ring 20, and another pad 38 which is located between the cam portion 52 of the dial rod 50 and the fitting ring 20 for reducing the frictional force.

In operation, the connection rod 60 is wrenched to actuate the dial rods 50 such that the cam portion 52 urges the fitting ring 20, thereby causing the head 32 of the shaft bolt 30 to fasten the two fitting rings 20 via the pad 36. The fitting rings 20 lash simultaneously the tangent slot 15 portion of the top ends of the outer tubes 14. As a result, the two pairs of inner and outer tubes 12 and 14 are located at the predetermined position. The fast dismantling device 10 is capable of fastening or unfastening simultaneously two pairs of inner and outer tubes 12 and 14.

Figure 3:
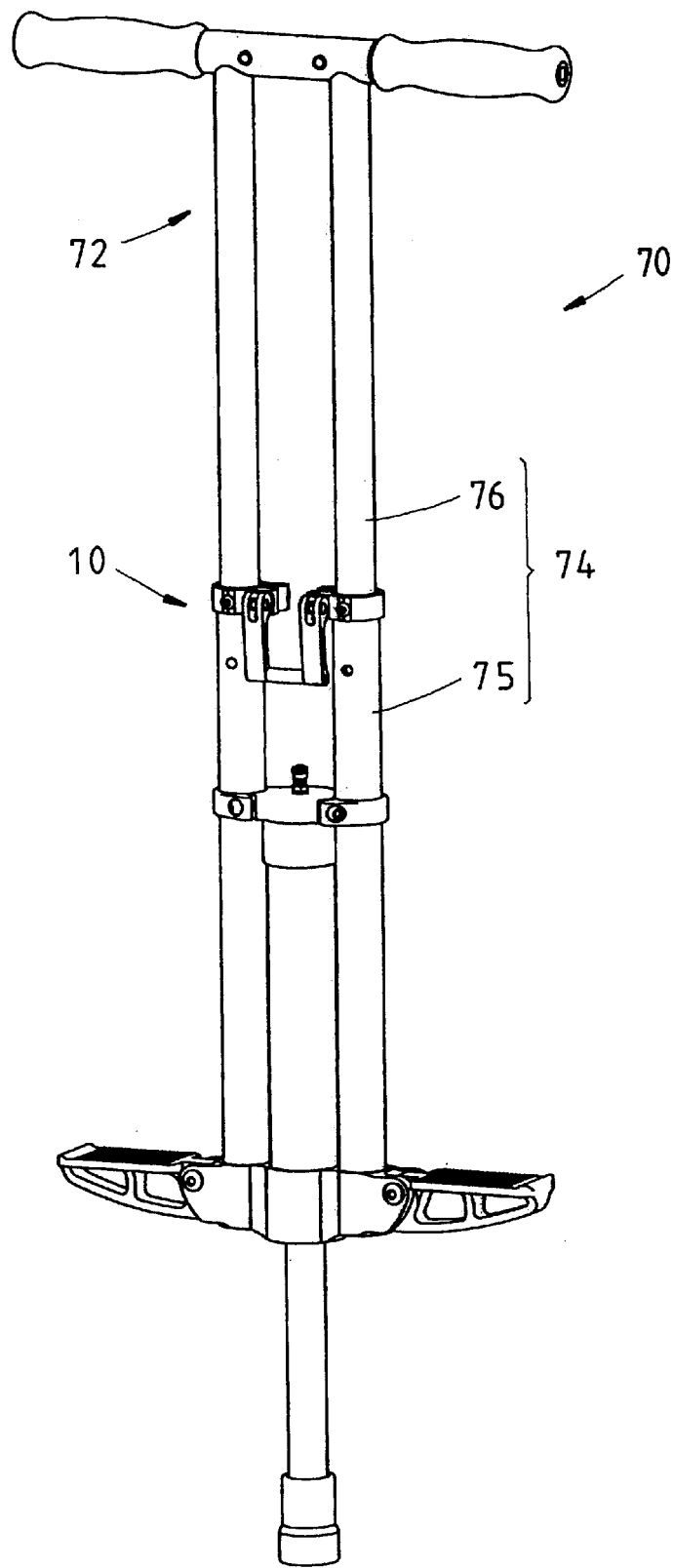
FIG. 3 shows a schematic view of the preferred embodiment of the present invention in application.

As shown in FIG. 3, the fast dismantling device 10 of the present invention is applied to a jumping apparatus 70, which comprises a handlebar frame 72 with two upright rods 74, each having an outer tube 75 and an inner tube 76. The outer tube 75 and the inner tube 76 move up and down at the same time. The fast dismantling device 10 is mounted on the two outer tubes 75. As the connection rod 60 is wrenched once, the inner tubes 76 and the outer tubes 75 are fastened or unfastened with ease and speed. The present invention works with two or more pairs of inner and outer tubes.

What is claimed is:

1. A fast dismantling device for permitting two pairs of inner and outer tubes to be separated simultaneously, said device comprising:

two fitting rings of a C-shaped construction and fitted over the outer tubes, said fitting rings provided with a through hole in a free end thereof;

two shaft bolts comprising a head and a shank extending from the center of said head such that said shank is received in said through hole of said fitting rings;

two pivots disposed at a free end of said shank of said shaft bolts;

two dial rods comprising a cam portion extending from one end of said dial rods and comprising two parallel actuation pieces between which said shank of said shaft bolts is disposed, each of said actuation pieces being provided with a through hole for receiving said pivot; and a connection rod connected at both ends thereof with said dial rods which are actuated by said connection rod to enable said fast dismantling device to fasten or unfasten the two pairs of inner and outer tubes.

2. The fast dismantling device as defined in claim 1, wherein said shank of said shaft bolts is provided on a free end with outer threads; wherein said pivots are provided with a threaded hole perpendicular to the longitudinal direction thereof, said threaded hole being engaged with said outer threads of said shaft bolts.

3. The fast dismantling device as defined in claim 1, wherein said dial rods are provided at one end with an end hole in which said connection rod is received.

4. The fast dismantling device as defined in claim 3, wherein said connection rod is connected with said dial rods such that both ends of said connection rod are received in said end holes of said dial rods.

5. The fast dismantling device as defined in claim 1, wherein said shank of said shaft bolts is provided with a pad which is located between the head of said shaft bolt and said fitting ring.

6. The fast dismantling device as defined in claim 1, wherein said shank of said shaft bolt is provided with a pad which is located between said cam portion of said dial rods and said fitting ring.

7. The fast dismantling device as defined in claim 1, wherein said fitting rings are provided with a threaded hole, and a bolt which is engaged with said threaded hole such that said bolt urges said outer tube.

* * * * *